United States Patent
Kijima et al.

(10) Patent No.: US 10,511,389 B2
(45) Date of Patent: Dec. 17, 2019

(54) PIEZOELECTRIC MODULE

(71) Applicant: TDK CORPORATION, Tokyo (JP)

(72) Inventors: Kaoru Kijima, Tokyo (JP); Akira Satoh, Tokyo (JP)

(73) Assignee: TDK CORPORATION, Tokyo (JP)

(*) Notice: Subject to any disclaimer, the term of this patent is extended or adjusted under 35 U.S.C. 154(b) by 88 days.

(21) Appl. No.: 15/230,981

(22) Filed: Aug. 8, 2016

(65) Prior Publication Data

US 2017/0041082 A1 Feb. 9, 2017

(30) Foreign Application Priority Data

Aug. 6, 2015 (JP) .................. 2015-156063

(51) Int. Cl.
| | |
|---|---|
| H04B 11/00 | (2006.01) |
| H04R 17/00 | (2006.01) |
| G10K 11/00 | (2006.01) |
| B06B 1/06 | (2006.01) |

(52) U.S. Cl.
CPC ............ *H04B 11/00* (2013.01); *B06B 1/0651* (2013.01); *G10K 11/002* (2013.01); *H04R 17/00* (2013.01)

(58) Field of Classification Search
CPC ........ H04R 17/00; H04R 17/10; H04B 11/00; B06B 1/0651; G10K 11/002
See application file for complete search history.

(56) References Cited

U.S. PATENT DOCUMENTS

| | | | | | |
|---|---|---|---|---|---|
| 2,534,883 | A | * | 12/1950 | Smyers | .................. C08L 7/00 156/242 |
| 3,970,879 | A | * | 7/1976 | Kumon | .................. G10K 9/122 310/324 |
| 9,054,826 | B2 | * | 6/2015 | Lawry | .................. H04L 5/0046 |
| 2004/0174772 | A1 | * | 9/2004 | Jones | .................. G10K 11/02 367/152 |
| 2008/0258841 | A1 | * | 10/2008 | Sherrit | .................. H01L 41/107 333/187 |
| 2011/0135123 | A1 | * | 6/2011 | Kim | .................. H04R 31/006 381/190 |
| 2014/0086436 | A1 | | 3/2014 | Kijima et al. | |

FOREIGN PATENT DOCUMENTS

| | | |
|---|---|---|
| CN | 102457248 A | 5/2012 |
| CN | 103686559 A | 3/2014 |
| JP | H11-52958 A | 2/1999 |
| JP | 4295781 B2 | 7/2009 |
| JP | 5578218 B2 | 8/2014 |

* cited by examiner

*Primary Examiner* — Hovhannes Baghdasaryan
(74) *Attorney, Agent, or Firm* — Oliff PLC

(57) ABSTRACT

Provided is a piezoelectric module capable of attempting further miniaturization. In the piezoelectric module, a resonance point is excluded from a frequency band of a transmitted signal to avoid shortening of a signal transmission distance, thereby attempting improvement in stability of communication. In addition, since a resonance space is not provided, further miniaturization may be easily attempted.

4 Claims, 3 Drawing Sheets

PIEZOELECTRIC MODULE

CROSS-REFERENCE TO RELATED APPLICATIONS

This application is based upon and claims the benefit of priority from Japanese Patent Application No. 2015-156063, filed on Aug. 6, 2015, the entire contents of which are incorporated herein by reference.

TECHNICAL FIELD

The present disclosure relates to a piezoelectric module that transmits an acoustic signal.

BACKGROUND

A communication method of transmitting a signal to a terminal using air as a medium has been known. This method uses an existing speaker corresponding to a pronunciation component and a microphone installed in a terminal such as a mobile phone (Japanese Patent No. 4295781 and the like).

Recently, transmission of data of program information from a speaker of a television, and transmission of data by a distance of about several meters from a small health care device have been under consideration as applications of the communication method.

Incidentally, a general speaker considered to be used in the communication method is mainly a dynamic type, and there is considerable difficulty in miniaturization, weight lightening, and power saving in this dynamic speaker.

For this reason, a piezoelectric module is preferable in miniaturizing a pronunciation component. The piezoelectric module easily achieves miniaturization, weight lightening, and power saving when compared to a dynamic speaker as disclosed in Japanese Unexamined Patent Publication No. H11-52958. For example, case dimensions of 13 mm or less in diameter and 8 mm or less in height may be achieved as a small piezoelectric module.

In such a piezoelectric module, a frequency band of 16 to 20 kHz is suitable for short distance transmission. At a lower frequency than 16 kHz, sound is easily heard, and thus this frequency is unsuitable for communication. In addition, at a higher frequency than 20 kHz, a data transfer rate is low, and thus this frequency is unsuitable for data communication.

However, when the above-described small piezoelectric module is employed as a pronunciation component, an unstable communication state, in which some signals do not arrive at a microphone for reception positioned at a predetermined distance (show distance), is generated in the frequency band of 16 to 20 kHz in some cases.

The inventors have conducted a keen examination on stability of this communication, and have found that a cause thereof is related to a resonance point of a piezoelectric module. That is, the inventors have found that, when a resonance point of a piezoelectric module is within a frequency band of a transmitted signal, a signal transmission distance is noticeably shortened at the resonance point. In this regard, the inventors have proposed a technology that attempts improvement in stability of communication by excluding a resonance point from a frequency band of a transmitted signal to avoid shortening of a signal transmission distance (see Japanese Patent No. 5578218).

However, a resonance space of a piezoelectric module hinders further miniaturization of the piezoelectric module, and thus a piezoelectric module not including any resonance space is desired.

SUMMARY

The present disclosure provides a piezoelectric module that can be further miniaturized.

A piezoelectric module according to an aspect of the present disclosure is a piezoelectric module for transmitting an acoustic signal, including a piezoelectric vibration plate including a piezoelectric element and a vibration plate having shapes of perfect discs and overlapping each other, a pair of terminals provided on the piezoelectric vibration plate and electrically connected to the piezoelectric element, a transmission member including a cloth-like member and adhesive materials formed on both surfaces of the cloth-like member, and an oscillating member to which the piezoelectric vibration plate is attached in a closely adhering state through the transmission member, in which a resonance point of the piezoelectric module is not present within a frequency range of the signal.

In the piezoelectric module, a resonance point is excluded from a frequency band of a transmitted signal to avoid shortening of a signal transmission distance, thereby attempting improvement in stability of communication. In addition, since a resonance space is not provided, further miniaturization may be easily attempted.

DETAILED DESCRIPTION

Figure 1:
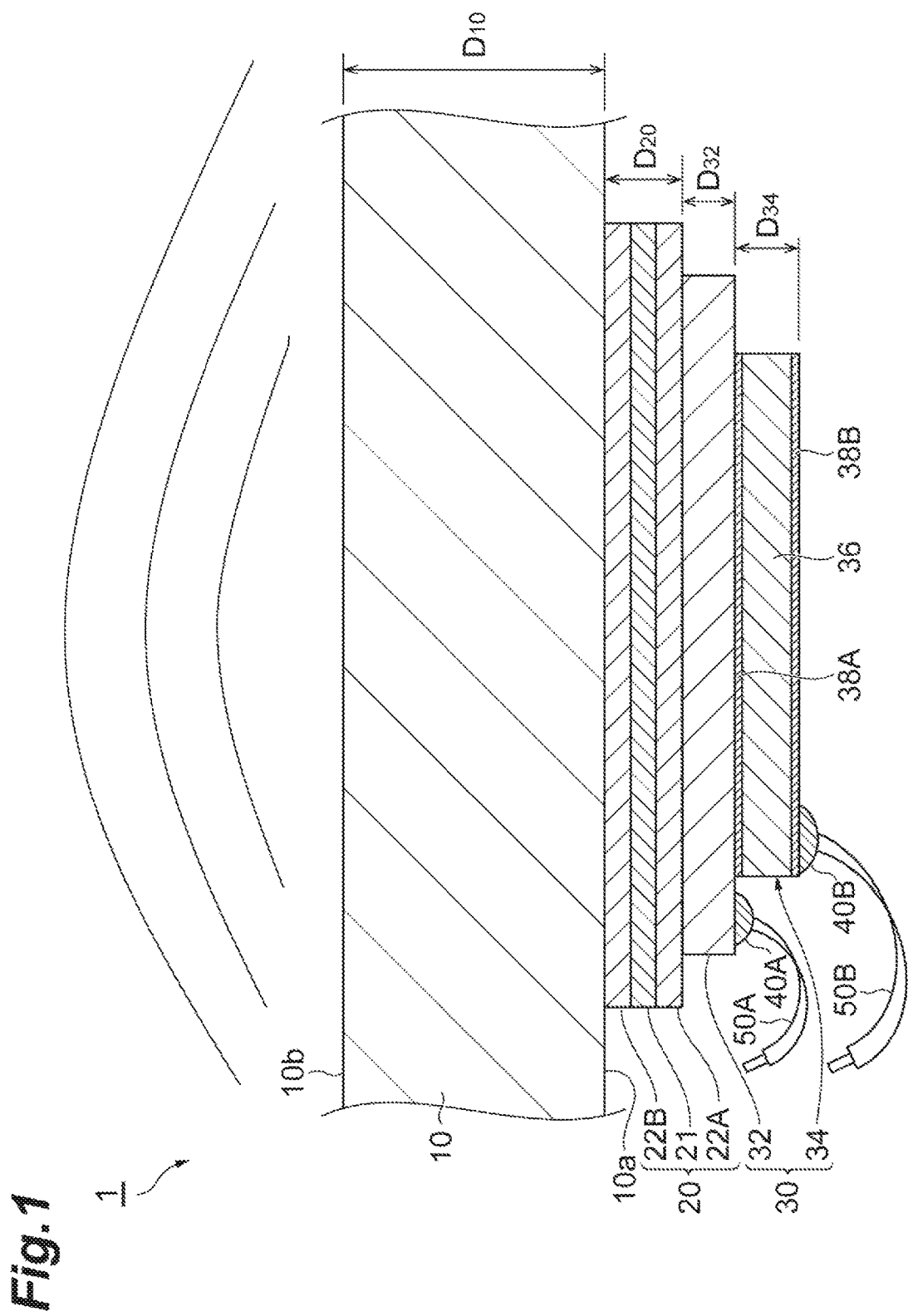
FIG. 1 is a schematic cross-sectional view illustrating a piezoelectric module according to an embodiment of the present disclosure.

Hereinafter, an embodiment of the present disclosure will be described in detail with reference to accompanying drawings. In description, the same reference numeral will be used for the same component or a component having the same function, and repeated description will be omitted.

A piezoelectric module according to the present disclosure is a device that sends an acoustic signal using air as a medium. For example, the piezoelectric module is used in short distance communication in a range of about 0.1 m to 2 in.

As illustrated in FIG. 1, a piezoelectric module 1 has a configuration in which a piezoelectric vibration plate 30 is attached to an oscillating member 10 through a transmission member 20.

The oscillating member 10 is a part that emits an acoustic signal. The oscillating member 10 illustrated in FIG. 1 has a plate-like portion which has a uniform thickness. However, a shape of the oscillating member 10 is not particularly restricted when an acoustic signal can be output in the shape. In addition, a constituent material of the oscillating member 10 is not particularly restricted when the material sufficiently vibrates in practice. For example, polycarbonate, and the like may be employed. For example, a thickness $D_{10}$ of the plate-like portion of the oscillating member 10 is in a rage of 0.3 to 1 mm, and is designed to be thicker than a thickness of a piezoelectric element 34 described below.

The piezoelectric vibration plate 30 is a disc-shaped member including a vibration plate 32 and a piezoelectric element 34. The vibration plate 32 and the piezoelectric element 34 are connected through a thin adhesive layer (not illustrated).

The vibration plate 32 is a plate-like body having a shape of a perfect circle. For example, the vibration plate 32 has a thickness $D_{32}$ in a range of 0.08 to 1.2 mm, and a diameter of 10.7 mm. The vibration plate 32 is made of a conductive material such as metal. For example, the vibration plate 32 is made of brass.

The piezoelectric element 34 has a shape of a perfect disc, a diameter of which is smaller than that of the vibration plate 32, and overlaps the vibration plate 32. Specifically, the piezoelectric element 34 and the vibration plate 32 concentrically overlap each other. For example, the piezoelectric element 34 has a thickness $D_{34}$ of 0.24 mm, and a diameter of 9 mm. The piezoelectric element 34 includes a main element body 36 (for example, a thickness of 0.1 mm) made of a piezoelectric material, and a pair of electrode films 38A and 38B (for example, a thickness of 0.07 mm) interposing the main element body 36 in a shape of a sandwich. The piezoelectric element 24 is not restricted to a single plate type illustrated in FIG. 1, and may correspond to a stacked type in which a piezoelectric layer and an internal electrode layer are alternately stacked. The piezoelectric element 34 may not concentrically overlap the vibration plate 32. For example, the piezoelectric element 34 and the vibration plate 32 may overlap each other in a state in which a center of the piezoelectric element 34 is shifted from a center of the vibration plate 32 in order to sufficiently ensure a formation region of a terminal 40A described below.

The piezoelectric vibration plate 30 further includes terminals 40A and 40B for applying a voltage to the piezoelectric element 34. The terminal 40A is provided on a surface of the vibration plate 32 on the piezoelectric element 34 side (more specifically, a residual region of the surface other than a region in which the piezoelectric element 34 is disposed). That is, the terminal 40A is electrically connected to the electrode film 38A of the piezoelectric element 34 on the vibration plate 32 side through the vibration plate 32 having conductivity. The terminal 40B is directly provided on the electrode film 38B on the opposite side from the vibration plate 32 side of the piezoelectric element 34, and is electrically connected to the electrode film 38B. Lead wires 50A and 50B connected to a power source (not illustrated) are attached to the pair of terminals 40A and 40B, respectively.

The transmission member 20 is a member that allows the oscillating member 10 and the piezoelectric vibration plate 30 to closely adhere to each other therebetween. The transmission member 20 closely adheres to one surface 10a of the oscillating member 10, and closely adheres to the vibration plate 32 of the piezoelectric vibration plate 30. The transmission member 20 is a sheet-like member in which a cloth-like member 21 is used as a base material and adhesive materials 22A and 22B are provided on both surfaces thereof. For example, a thickness $D_{20}$ of the transmission member 20 is in a range of 1.2 to 1.6 mm. In addition, as illustrated in FIG. 1, the transmission member 20 is provided in a wider region than a placing region (so-called footprint) of the piezoelectric vibration plate 30, and allows the piezoelectric vibration plate 30 to closely adhere to the oscillating member 10 in a whole area of the placing region of the piezoelectric vibration plate 30.

For example, the cloth-like member 21 of the transmission member 20 is a nonwoven fabric of a cellulose fiber. For example, the adhesive materials 22A and 22B of the transmission member 20 are made of an acrylic pressure sensitive adhesive. The transmission member 20 is made of a material having hardness in a range suitable for vibration transmission in order to transmit vibration of the piezoelectric vibration plate 30 up to the oscillating member 10. For example, silicone resin has significantly low hardness at the time of adhesion, and thus absorbs vibration. Therefore, silicone resin cannot be used for the transmission member 20. Meanwhile, epoxy resin has significantly high hardness at the time of adhesion, and thus has difficulty in propagating vibration. Therefore, epoxy resin cannot be used for the transmission member 20.

In the above-described piezoelectric module 1, when a signal whose voltage direction is alternately changed (AC voltage) is input between the pair of terminals 40A and 40B, the piezoelectric element 34 expands and contracts in a surface direction. In addition, vibration resulting from expansion and contraction of the piezoelectric element 34 is transmitted to the oscillating member 10, and the oscillating member 10 emits a sound wave having a predetermined frequency from the other surface 101). Since the piezoelectric element 34 has the perfect disc shape, only resonance of a fundamental frequency (primary amplitude mode) is generated. In a piezoelectric element having a shape other than the perfect disc shape (shape of a rectangular plate, and the like), resonance not in a primary amplitude mode is generated.

Next, a resonance point of the above-described piezoelectric module 1 will be described with reference to FIG. 2 and FIG. 3.

A resonance point (a resonance frequency fr and an antiresonance frequency fa) of the piezoelectric module 1 may be represented as below based on an equivalent circuit in the vicinity of a resonance frequency illustrated in FIG. 2.

$fr=1/\{2\pi\sqrt{L_1C_1}\}$ [Equation 1]

Figure 2:
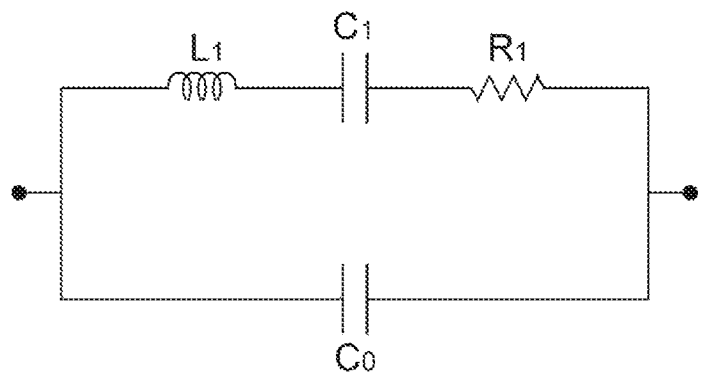
FIG. 2 is a diagram illustrating an equivalent circuit in the vicinity of a resonance point of the piezoelectric module illustrated in FIG. 1.

$fa=1/\{2\pi\sqrt{L_1C_0C_1/(C_1+C_0)}\}$ [Equation 2]

in FIG. 2 and the above two Equations, $L_1$ denotes a series inductance, $C_1$ denotes a series capacitance, $C_0$ denotes a parallel capacitance, and $R_1$ denotes a series resistance.

In addition, when the resonance frequency ft and the anti resonance frequency fa of the piezoelectric module 1 are actually obtained, an impedance analyzer is connected to the terminal pair 40A and 40B of the piezoelectric module 1 to sweep a frequency, and an impedance and a phase are measured to calculate a resonance point. For example, an impedance analyzer 4194 made by Hewlett-Packard Company may be used as the impedance analyzer.

Figure 3:
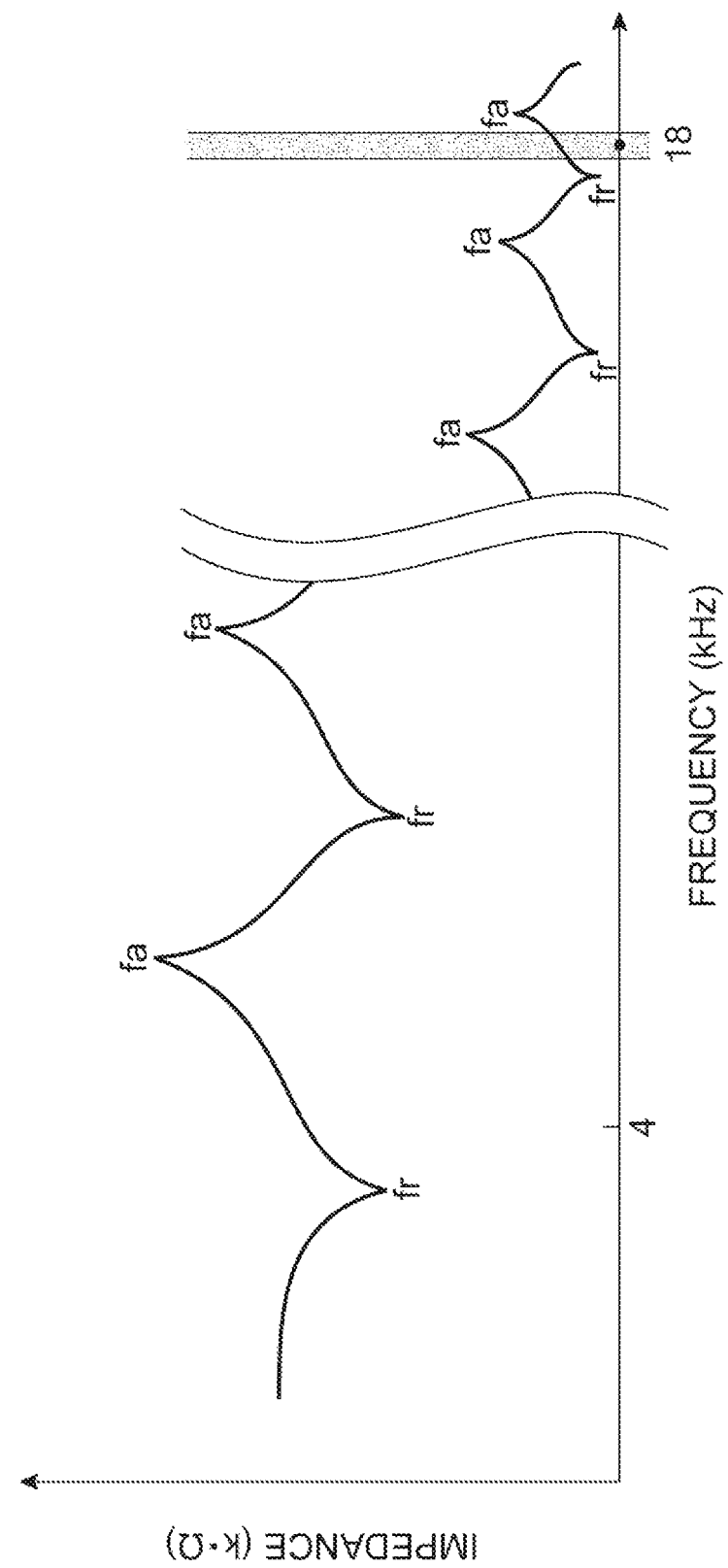
FIG. 3 is a diagram illustrating an impedance characteristic of the piezoelectric module illustrated in FIG. 1.

FIG. 3 is a graph illustrating an impedance characteristic of the piezoelectric module 1, and the resonance points ft and fa are indicated in the graph. As illustrated in the graph, a plurality of resonance points ft and fa resulting from component parts such as the oscillating member 10, the transmission member 20, the piezoelectric vibration plate 30, and the terminal pair 40A and 40B are present in the piezoelectric module 1.

The piezoelectric module 1 uses a frequency band in the vicinity of 18 kHz indicated by a dot in FIG. 3 (more specifically, a 1.6 kHz to 20 kHz band) as a frequency range of a transmitted signal. In the piezoelectric module 1, the frequency band of 16 to 20 kHz is suitable for short distance transmission. At a lower frequency than 16 kHz, sound is easily heard, and thus this frequency is unsuitable for communication. In addition, at a higher frequency than 20 kHz, a data transfer rate is low, and thus this frequency is unsuitable for data communication.

In addition, in the piezoelectric module 1, any one of the resonance points ft and fa of the piezoelectric module 1 is not present in the frequency band of 116 to 20 kHz, which is based on discovery that, when any one of the resonance points ft and fa of the piezoelectric module is within a frequency band of a transmitted signal, a signal transmission distance is noticeably shortened at the resonance point. The signal transmission distance is considered to be shortened since energy for transmitting an acoustic signal of the piezoelectric module is consumed as resonance energy of the piezoelectric module.

In this regard, shortening of a signal transmission distance generated at a resonance point is avoided by excluding all the resonance points ft and fa of the piezoelectric module 1 from a frequency band in the vicinity of 18 kHz which is a frequency band of a transmitted signal. That is, in the piezoelectric module 1, a signal transmission distance is not shorted in a whole area of a frequency band of a transmitted signal, and thus communication may be reliably performed at a designed distance, and high stability of communication is achieved.

As described in the foregoing, in the piezoelectric module 1, a resonance point is excluded from a frequency band of a transmitted signal to avoid shortening of a signal transmission distance, thereby attempting improvement in stability of communication. In addition, the piezoelectric module 1 has a configuration in which an acoustic signal is sent without providing a resonance space, and thus further miniaturization may be easily attempted without being inhibited by the resonance space.

What is claimed is:

1. A piezoelectric module for transmitting an acoustic signal, comprising:
   a piezoelectric vibration plate including a piezoelectric element and a vibration plate having shapes of perfect discs and overlapping each other;
   a pair of terminals provided on the piezoelectric vibration plate and electrically connected to the piezoelectric element;
   a transmission member including a cloth member and adhesive materials formed on both surfaces of the cloth member; and
   an oscillating member to which the piezoelectric vibration plate is attached in a closely adhering state through the transmission member, wherein:
   a resonance point of the piezoelectric module is not present within a frequency range of the acoustic signal;
   a diameter of the piezoelectric element is smaller than that of the vibration plate,
   the vibration plate is made of conductive material and has a surface that faces the piezoelectric element,
   the surface of the vibration plate includes a first portion that is overlapped by the piezoelectric element and a second portion that is not overlapped by the piezoelectric element, and
   one of the pair of terminals is formed on the second portion of the surface of the vibration plate.

2. The piezoelectric module according to claim 1, wherein the piezoelectric element has a first surface that faces the vibration plate, and a second surface opposite to the first surface, one of the pair of terminals being formed on the second surface.

3. The piezoelectric module according to claim 1, wherein the vibration plate is a metal plate.

4. The piezoelectric module according to claim 1, wherein the acoustic signal has a frequency band of 16 to 20 kHz.

* * * * *